(12) United States Patent
Tobiason

(10) Patent No.: US 8,605,291 B2
(45) Date of Patent: Dec. 10, 2013

(54) IMAGE CORRELATION DISPLACEMENT SENSOR

(75) Inventor: Joseph Daniel Tobiason, Woodinville, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 319 days.

(21) Appl. No.: 12/958,055

(22) Filed: Dec. 1, 2010

(65) Prior Publication Data

US 2012/0140245 A1 Jun. 7, 2012

(51) Int. Cl.
*G01B 11/14* (2006.01)

(52) U.S. Cl.
USPC .......................................... 356/614; 356/622

(58) Field of Classification Search
USPC ......... 356/614–615, 620–624, 450, 485, 492, 356/489, 495, 511–515, 521, 28.5, 498, 356/486, 493, 496
See application file for complete search history.

(56) References Cited

U.S. PATENT DOCUMENTS

| | | | |
|---|---|---|---|
| 5,434,632 | A | 7/1995 | Carmichael |
| 5,783,752 | A | 7/1998 | Thorburn |
| 6,256,016 | B1 | 7/2001 | Piot |
| 6,352,508 | B1 | 3/2002 | Pang |
| 6,642,506 | B1 | 11/2003 | Nahum |
| 7,295,324 | B2 | 11/2007 | Jones |
| 7,515,280 | B2 | 4/2009 | Emtman |
| 2002/0036904 | A1 | 3/2002 | Kawashima |
| 2004/0190749 | A1 | 9/2004 | Xu |
| 2007/0211256 | A1 | 9/2007 | Medower |

FOREIGN PATENT DOCUMENTS

EP 1 262 738 A1 12/2002

OTHER PUBLICATIONS

Gao, W., "Micro and Nano Measurement Instruments," Proceedings of the 10th International Conference of the European Society for Precision Engineering & Nanotechnology, Delft, Netherlands, May 31-Jun. 4, 2010, pp. 235-238.
Krüger, S., and A. Calway, "Image Registration Using Multiresolution Frequency Domain Correlation," Proceedings of the Ninth British Machine Vision Conference, Southampton, U.K, Sep. 1998, pp. 316-325.
Lichtenberger, R., and H. Schreier, "Contactless and Fullfield 3D-Deformation Measurement for Impact and Crash Tests," LIMESS Messtechnik u. Software GmbH, Pforzheim, Germany, 8 pages.

(Continued)

*Primary Examiner* — Tri T Ton
(74) *Attorney, Agent, or Firm* — Christensen O'Connor Johnson Kindness PLLC

(57) ABSTRACT

An image correlation displacement sensor is provided for measuring yaw rotation relative to a target surface using a simple configuration compatible with a fast measurement sample rate. The image correlation displacement sensor may include: an illumination portion (130) which emits illumination light to the target surface to produce a speckle field; an imaging portion (240) which captures a plurality of images including the speckle fields produced on the target surface; and a processing portion (200) which measures a displacement including a rotation about a yaw axis of the target surface in accordance with first and second region translational displacements determined based on the plurality of images captured along the first optical path and the second optical path, and a known separation between the first and second regions.

16 Claims, 1 Drawing Sheet

(56) References Cited

OTHER PUBLICATIONS

Ourselin, S., et al., "Block Matching: A General Framework to Improve Robustness of Rigid Registration of Medical Images," Proceedings of the Third International Conference on Medical Image Computing and Computer-Assisted Intervention (MICCAI 2000), Pittsburgh, Oct. 11-14, 2000, Lecture Notes in Computer Science 1935:557-566, 2000.

Regez, , B., et al., "In-Plane Deformation Measurements Using Digital Image Correlation of Ultrasonic C-Scan Image," Proceedings of the ASME 2003 International Mechanical Engineering Congress and Exposition (IMECE2003), Washington, D.C., Nov. 15-21, 2003, Abstract only, 1 page.

Su, C., and L. Anand, "A New Digital Image Correlation Algorithm for Whole-Field Displacement Measurement," SMA Annual Symposium on Innovation in Manufacturing Systems & Technology (IMST), Singapore, Jan. 17-18, 2003, 8 pages.

Vendroux, G., and W.G. Knauss, "Submicron Deformation Field Measurements II: Improved Digital Image Correlation," Technical Report, California Institute of Technology, Pasadena, Calif., 1994, pp. 1-14.

Yu, J.H., et al., "Real-Time Full-Field Deformation Analysis on the Ballistic Impact of Polymeric Materials Using High-Speed Photogrammetry," Report No. ARL-RP-0290, Army Research Laboratory, Apr. 2010 (a reprint from the American Society for Composites 24th Technical Conference, Newark, Del., Sep. 15-17, 2009), 16 pages.

Zhou, P., and K.E. Goodson, "Subpixel Displacement and Deformation Gradient Measurement Using Digital Image/Speckle Correlation (DISC)," Optical Engineering 40(8):1613-1620, Aug. 2001.

Tobiason, J.D., "Image Correlation Displacement Sensor," U.S. Appl. No. 12/898,642, filed Oct. 5, 2010.

Briers, J.D., "Holographic, Speckle and Moiré Techniques in Optical Metrology," Progress in Quantum Electronics 17(3):167-233, 1993.

Extended European Search Report mailed Feb. 24, 2012, issued in European Application No. EP 11 183 964, filed Oct. 5, 2011, 8 pages.

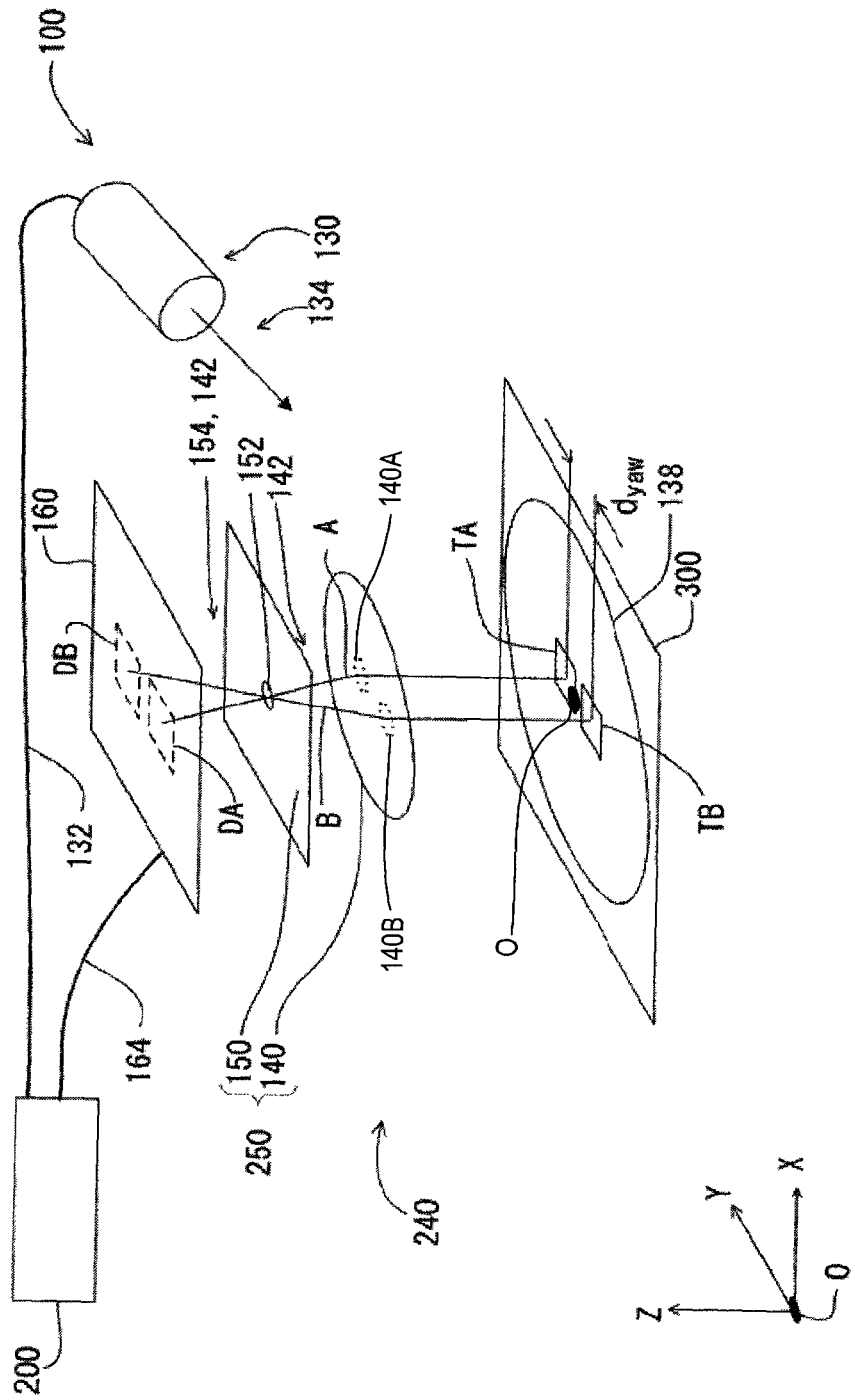

IMAGE CORRELATION DISPLACEMENT SENSOR

INCORPORATION BY REFERENCE

U.S. Pat. No. 6,642,506, filed on Jun. 1, 2000, U.S. Pat. No. 7,295,324, filed on Jul. 13, 2004, and U.S. Pat. No. 7,515,280, filed on May 12, 2004, are each hereby incorporated herein in their entirety by reference.

BACKGROUND

1. Field of the Invention

The present invention relates to an image correlation displacement sensor, and more particularly, to an image correlation displacement sensor that captures speckle fields to measure a displacement of an object.

2. Description of Related Art

Image correlation displacement sensors using a correlation between a plurality of speckle fields (speckle images) are known (see U.S. Pat. No. 6,642,506, U.S. Pat. No. 7,295,324, and U.S. Pat. No. 7,515,280). In general, a coherent light source such as a laser light source is used for each image correlation displacement sensor. A speckle field is produced by illuminating an optically rough surface with the coherent light source. Specifically, a target surface of an object to be measured is illuminated with coherent light, and light scattered from the target surface is detected by a detector such as a CCD camera or a CMOS image sensor. Thus, the speckle field can be captured in an image or images.

First, a speckle field before displacement is captured, and the captured speckle field is stored into a memory or the like as a first speckle image. Next, a speckle field after displacement is captured, and the captured speckle field is stored into a memory or the like as a second speckle image. Then, a displacement of the target surface is measured based on results of comparison between the first speckle image and the second speckle image.

In the image correlation displacement sensor that measures a displacement by capturing speckle fields, a relatively high sample rate may be a desirable characteristic. The sample rate may depend on the size of the images acquired, the type of correlation calculations performed in order to determine displacement, and the amount of image data used in the correlation calculations. When linear displacement in only an X and/or a Y direction is desired, a relatively high sample rate may be maintained. However, when it is desired to measure and/or compensate for a rotational displacement (e.g., a rotation about a yaw axis which is normal to the X and Y axes, the correlation calculations may become time consuming and the sample rate may suffer. For example, "Submicron Deformation Field Measurements II: Improved Image Correlation," G. Vendroux and W. G. Knauss, EXPERIMENTAL MECHANICS, Volume 38, Number 2, pp. 86-92 (hereinafter referred to as "Non-patent Document 1") discloses that a displacement in X and Y directions and a rotation angle θ are measured. In Non-patent Document 1, however, it is concluded that relatively complicated rotational correlation calculations are needed in order to prevent significant errors in typical correlation measurements for determining displacement. However, this conclusion has adverse consequences in many applications, in that the associated calculation time increases, and the potential measurement sample rate is decreased. Such an outcome is undesirable in a number of applications, and particularly when displacement is more important than strain, and/or when relatively large or fast displacements are to be monitored.

It is an object of the present invention to provide an image correlation displacement sensor capable of measuring a rotation about a yaw axis with a simple method and at a high sample rate.

SUMMARY

According to one aspect of the present invention, an image correlation displacement sensor is used for measuring a positional displacement relative to a target surface, the image correlation displacement sensor including: an illumination portion which emits illumination light to the target surface to produce a speckle field; an imaging portion including: a first optical path which is used to capture a plurality of images including the speckle fields produced on the target surface and a second optical path which is used to capture a plurality of images including the speckle fields produced on the target surface; and a processing portion which measures a displacement including a rotation about a "yaw axis" aligned along a direction including a component normal to the target surface, based on the plurality of images captured along the first optical path and the second optical path.

According to further aspect of the invention, the image correlation displacement sensor measures a displacement including a rotation about the yaw axis direction (referred to as yaw rotation) at high speed with a simple configuration. In some embodiments, translational and yaw rotational components of displacement are both determined during a single sample period. In some embodiments, the translational and yaw rotational components of displacement are determined cooperatively with one another, or the yaw rotation is determined based on the translational components of displacement. According to further aspect of the invention, the foregoing method of determining yaw rotation allows a high measurement sample rate, which in turn provides measurement images with small rotational differences which satisfy small angle constraints in order to maintain a desired level of accuracy or repeatability. Thus, the combination of the computation method and its resulting fast computation and measurement sample rate provide a combination of measurement rate and accuracy which is advantageous in a number of applications. For example, such an outcome is particularly desirable in applications when displacement is more important than strain, and/or when relatively large or fast displacements are to be monitored. According to a further aspect of the invention, in some embodiments, the determined yaw rotation may be compared to a single sample rotation limit (e.g., one degree) in order to determine if a rotational limit associated with an undesirable error level has been exceeded between two correlation measurement images. In some such embodiments, the image correlation displacement sensor indicates that the rotational limit has been exceeded and/or interrupts or supplements measurement output with an error indication.

The above and other objects, features and advantages of the present invention will become more fully understood from the detailed description given herein below and the accompanying drawings which are given by way of illustration only, and thus are not to be considered as limiting the present invention.

BRIEF DESCRIPTION OF THE DRAWINGS

FIG. 1 is a diagram schematically showing an image correlation displacement sensor according to an exemplary embodiment of the present invention.

DETAILED DESCRIPTION OF THE EXEMPLARY EMBODIMENTS

Exemplary embodiments of the present invention will be described below with reference to the accompanying drawing. In the following description, preferred exemplary embodiments of the present invention will be described and illustrated, but the scope of the present invention is not limited to the embodiments described below.

An image correlation displacement sensor according to an exemplary embodiment of the present invention is described with reference to FIG. 1. FIG. 1 is a diagram schematically showing the overall configuration of the image correlation displacement sensor (hereinafter abbreviated as "displacement sensor"). A displacement sensor 100, which measures a displacement of an object having a target surface 300, includes an illumination portion 130, an imaging portion 240, and a processing portion 200. The displacement sensor 100 is mounted in a measuring head, for example.

For clarity of explanation, the image correlation displacement sensor according to this exemplary embodiment is described using a three-dimensional Cartesian coordinate system. Referring to FIG. 1, a Z-direction is parallel to an input optical axis of an optical system 250 (described in greater detail below), an X-direction is perpendicular to the Z-direction and desirably parallel to a row or column direction of a pixel array of a detector 160 (e.g., for computational efficiency), and a Y-direction is perpendicular to the X-direction and Z-direction. Preferably, the displacement sensor 100 and/or the target surface 300 are arranged such that the Z-direction is approximately normal to the target surface 300. In the following description, unless explicitly specified otherwise, the term "normal" refers to a normal to the target surface 300, and may also generally correspond to an input optical axis of the optical system 250. Further, as illustrated in FIG. 1, a point on the target surface 300 is set as an origin O. Note that the origin O is set at an intermediate position between an area TA and an area TB which are described later. The displacement sensor 100 is capable of measuring positional displacements along the X-direction, Y-direction, and rotation about a yaw axis (that is, an axis along the Z direction). The displacement sensor 100 is configured to measure minute three-degree of freedom displacements with high accuracy.

The illumination portion 130 emits coherent light to illuminate the target surface 300 of the object to be measured. Specifically, the coherent light emitted from the illumination portion 130 corresponds to illumination light 134 for illuminating the target surface 300. The illumination portion 130 includes a laser light source, for example. The illumination portion 130 may include any type of light source, as long as the light source can emit coherent light. The illumination light 134 from the illumination portion 130 may be incident on the target surface 300 along a desired design direction. When the illumination light 134 from the illumination portion 130 is incident on the target surface 300, an illumination spot 138 is formed on the target surface 300.

The target surface 300 typically is an optically rough diffusing surface. Accordingly, when the target surface 300 is illuminated with the coherent light, a speckle field is produced. In other words, the diffuse light reflected from the target surface 300 produces a speckle field. To form the illumination spot 138 with a desired size and shape, a lens or the like may be included in the illumination portion 130, if desired. For instance, the illumination spot 138 may be formed in an elliptical shape by providing a cylindrical lens in the illumination portion 130.

Light rays diffused in various directions by the target surface 300 interfere with each other to thereby produce a speckle field. In the displacement sensor 100 according to this exemplary embodiment, such a speckle field is captured in an image formed by the imaging portion 240 and acquired by the detector 160. The speckle field, which is produced by the interference of the diffused light rays, is produced in three dimensions. In other words, the speckle field fills a volume above the surface 300 and includes a speckle pattern that moves in correspondence to the surface 300. Thus, an image of the speckle field varies depending on the position of the target surface 300 relative to the displacement sensor 100. It will be appreciated that the schematically represented target surface 300 shown in FIG. 1 may have any desired size, in practice. Next, the imaging portion 240 for capturing a speckle field will be described.

Regarding the imaging portion 240, it includes a lens 140, an aperture plate 150, and a detector 160. Speckle image light from the target surface 300 enter the lens 140. The lens 140 is a convex lens, for example, and refracts and/or focuses the incident diffused light.

Speckle image light (e.g., the light beams 142 and 154) refracted and/or focused by the lens 140 reaches the aperture plate 150. An open aperture 152 is located at the center of the aperture plate 150.

In a preferred embodiment, the imaging portion 240, the lens 140 and the aperture plate 150 are configured as an optical system 250 that is a telecentric system. That is, the lens 140 and the aperture 152 are spaced apart from each other by approximately the back focal length of the lens 140. The lens 140 may be located at approximately its front focal length from the target surface 300 in some embodiments, such that it images the speckle field adjacent to the target surface 300. The aperture 152 is located approximately on the optical axis of the lens 140. Light beams falling outside of the aperture 152 are blocked by the aperture plate 150. Accordingly, a particular light beam 142 from a particular optical path entering the aperture 152 passes through and reaches the detector 160 at a particular location (e.g., the locations corresponding to detectors or detection portions DA and/or DB, as described further below) that correspond to a particular portion of the speckle field and/or the adjacent portion of the target surface 300. When the optical system 250 is telecentric, only speckle image light beams that are approximately parallel to the optical axis of the lens 140 are the light beams 142 that pass through the aperture 152 to become the detected light beams 154.

The light beams 154 and 142 passing through the aperture plate 150 enter the detector 160. The detector 160 captures an image of the speckle field produced on the target surface 300. In the embodiment shown in FIG. 1, the detector 160 is a single two-dimensional array photodetector which is, for example, a CCD (Charge Coupled Device) camera or a CMOS (Complementary Metal Oxide Semiconductor) image sensor. The receiving surface of the detector 160 has light-receiving pixels arranged in an array. For example, the receiving surface of the detector 160 is parallel to an XY plane.

Further, the detector 160 includes the detection portion DA and the detection portion DB. Herein, the detection portion DA comprises a part of a single detector 160. Similarly, the detection portion DB comprises a part of the detector 160. Each of the detection portions DA and DB has a two-dimensional pixel array, which in some embodiments may be parts or sub-arrays of a larger two-dimensional pixel array of the detector 160. The detection portions DA and DB are disposed at different positions on the receiving surface of the detector 160. Preferably, the detection portions DA and DB are disposed at different positions on the receiving surface of the detector 160 so as not to overlap each other. The detection portion DA receives the speckle image light from an area TA on the target surface 300 to capture a speckle image. Similarly, the detection portion DB receives the speckle image light from an area TB on the target surface 300 to capture a speckle image. In some embodiments, each of the speckle images of the areas TA and TB may be parts or sub-images of a larger image captured by the detector 160. In any case, the target surface 300 may be detected or imaged at multiple points (e.g., corresponding too TA and TB) before and after a displacement and the resulting images may be used to determine the displacement.

In the embodiment shown in FIG. 1, the origin is defined such that the areas TA and TB are arranged on the Y-axis and symmetrically about the X-axis. The area TA is disposed on the +Y side with respect to the origin O, and the area TB is disposed on the −Y side with respect to the origin O. A distance between the areas TA and TB is represented by $d_{yaw}$. In the absence of yaw rotation, the X-coordinates of the areas TA and TB are the nominally same. Referring to FIG. 1, the areas TA and TB are square in shape, but the operational shape of each of the imaged areas TA and TB may be defined by the design of the optical system and/or detector signal processing choices and is not particularly limited. The areas TA and TB may have different sizes or the same size. The illumination portion 130 illuminates a sufficiently wider area than the area including the areas TA and TB.

The imaging portion 240 captures the speckle fields that are imaged along the optical paths that include the areas TA and TB on the target surface 300. The speckle fields that are imaged along these optical paths may be projected onto different locations of a single detector 160 as described above. Assume herein that an optical path for capturing the speckle field produced in the area TA is an optical path A. Speckle image light from the area TA propagates along the optical path A and enters the detection portion DA. Similarly, assume that an optical path for capturing the speckle field produced in the area TB is an optical path B (see FIG. 1). The optical path A herein described refers to a principal ray of the speckle image light that propagates through the aperture 152 from a speckle field proximate to the area TA and enters the detection portion DA. Similarly, the optical path B refers to principal rays of the speckle image light that propagates through the aperture 152 from a speckle field proximate to the target surface 300 and enters the detection portion DB. For instance, a line connecting the center of the area TB and the center of the detection portion DB via the center of the aperture 152 corresponds to the optical path B. As described later, the optical paths A and B are refracted by the lens 140.

As illustrated in FIG. 1, the optical paths A and B are perpendicular to the target surface 300 in proximity to the target surface 300. In other words, the optical paths A and B are parallel to the Z-direction in proximity to the target surface 300. Note that the phrase "in proximity to the target surface 300" indicates a space between the target surface 300 and the lens 140.

The optical paths A and B enter the lens 140. Accordingly, the optical paths A and B are refracted by the lens 140 and are directed to the aperture 152. The optical paths A and B are incident on different positions of the lens 140, designated 140A and 140B, respectively. For instance, the light flux from the area TA that includes the optical path A has a principal ray that passes through a part of the lens 140. Between the target surface 300 and the lens 140, the optical paths A and B are parallel to the Z-direction. Further, the aperture 152 is disposed at the rear-side focus position of the lens 140. Thus, the optical paths A and B pass through the center of the aperture 152 of the aperture plate 150 and enter the detector 160. It will be appreciated that an optical path (e.g., the optical path A) is primarily defined by the location of a detector (e.g., the detector DA) and the aperture 152. The location of a lens portion (e.g., 140A) that is associated with a particular optical path (e.g., optical path A) is the portion of the lens 140 that is aligned with those elements. Light beams which propagate in directions significantly different from the optical paths A and B, or light beams which deviate significantly from the principal rays, are blocked by the aperture plate 150. One skilled in the art may configure various embodiments, in addition to those disclosed herein, according to these design principles.

The optical paths A and B passing through the aperture 152 enter the detection portions DA and DB, respectively. The detection portion DA captures a speckle field image along the optical path A. Similarly, the detection portion DB captures a speckle field image along the optical path B. The optical paths A and B are parallel to the normal to the target surface 300 in proximity to the target surface 300. Accordingly, the optical paths A and B are used to capture speckle field images along a direction normal to the target surface 300 in proximity to the target surface 300.

Herein, the speckle field images produced along the optical paths A and B are captured by a single detector 160. Image data of the speckle fields acquired by the detector 160 is transmitted through a signal line 164 and is input to the processing portion 200. The imaging portion 240 captures speckle fields multiple times for each of the optical paths A and B. Then, the image data of a plurality of speckle fields is stored in the processing portion 200. In other words, the detection portion DA captures the speckle field, which is produced along the optical path A, multiple times. Then, the processing portion 200 stores the image data of the plurality of captured speckle fields. Similarly, the processing portion 200 stores a plurality of image data items of the speckle fields (speckle image data) produced along the optical path B. The processing portion 200 carries out a correlation processing based on the speckle image data. Specifically, a displacement is measured by obtaining a correlation between speckle image data acquired before movement and speckle image data acquired after movement. The processing portion 200 may determine displacements for three degrees of freedom, as described further below. Further, the processing portion 200 may control the illumination light 134 of the illumination portion 130 through a signal line 132.

The processing portion 200 is an information processor such as a personal computer or DSP, and performs a predetermined calculation processing for image data. More specifically, the processing portion 200 is a computer including a CPU and a storage area such as a memory. For instance, the processing portion 200 includes a CPU (Central Processing Unit) serving as an arithmetic processing portion, a storage area such as a ROM (Read Only Memory) or a RAM (Random Access Memory), and a communications interface, and executes processing necessary for measuring displacements. The ROM stores, for example, an arithmetic processing program for performing an arithmetic processing and various configuration data. The CPU reads out the arithmetic processing program stored in the ROM, and develops the program in the RAM. Then, the program is executed according to the configuration data and the output from the detector 160 and the like. In addition, the processing portion 200 may include a monitor or the like for displaying results of the arithmetic processing.

The processing portion 200 performs a correlation processing on the speckle images which are acquired before and after the movement of the target surface 300. A speckle image acquired before the relative moment of the target surface 300 is set as a reference speckle image, and a speckle image acquired after the movement is set as a measured speckle image. Specifically, in one embodiment, the processing portion 200 adds an offset along a displacement direction to the measured speckle image, and calculates a correlation value between the reference speckle image and the measured speckle image. In this case, for a given X and/or Y displacement, an offset is added along the X-direction and/or Y-direction in which the light-receiving pixel array of the detector 160 is arranged. In other words, an offset along the X-direction and an offset along the Y-direction are separately added to the pixel locations of the measured speckle image. The processing portion 200 calculates a correlation value for each offset. As for the correlation processing, methods disclosed in U.S. Pat. No. 6,642,506, U.S. Pat. No. 7,295,324, and U.S. Pat. No. 7,515,280, or methods disclosed in the documents cited in these documents may be employed, for example. It will be appreciated that, most generally, the speckle images operated upon in this manner may comprise the entire array area of the detector 160, or may a comprise a sub-array thereof (e.g., corresponding to the detector portion DA or DB). Stated another way, a plurality of images from the detector portion DA may comprise first image portions of a set of images acquired by the common or shared detector 160 and a plurality of images from the detector portion DB may comprise second image portions of that same set of images acquired by the common or shared detector 160.

The processing portion calculates an image displacement based on results of the correlation processing. The image displacement is a value corresponding to a positional displacement of the measured speckle image with respect to the reference speckle image. For instance, an offset value obtained when the correlation value is greatest corresponds to an image displacement. A correlation value curve may be analyzed to determine the correlation value peak locations with sub-pixel accuracy. The image displacement may be a pixel displacement corresponding to a light-receiving pixel of the detector 160. The number of pixels (and fraction of a pixel) by which the speckle image is moved in the receiving surface, for example, may be used as the displacement. Alternatively, known design constants may be used to convert a displacement in pixels to a displacement of the target surface 300 which is used as the image displacement. For example, the pixel displacement can be converted into the actual displacement by using an imaging magnification or the like. In the manner as described above, an X and/or Y translational image displacement is calculated for the image area used for the calculations.

According to a preferred method for fast displacement determination, in order to determine a yaw rotation, the processing portion 200 performs translational correlation processing on each of the reference speckle image and the measured speckle image acquired by the detection portion DA and the reference speckle image and the measured speckle image acquired by the detection portion DB. Then, the processing portion 200 calculates image displacement based on results of the correlation processing. Thus, a translational displacement is calculated for each of the reference speckle image and the measured speckle image acquired by the detection portion DA and the reference speckle image and the measured speckle image acquired by the detection portion DB. Herein, the image displacement based on the speckle image acquired by the detection portion DA is represented by $(X_A, Y_A)$, and the displacement based on the speckle image acquired by the detection portion DA is represented by $(X_B, Y_B)$.

In one embodiment, the processing portion 200 calculates a both translational and rotational displacement of an object to be measured by using the two displacements $(X_A, Y_A)$ and $(X_B, Y_B)$. When the object to be measured is translated in the X and Y directions, the displacement $(X_A, Y_A)$ and the displacement $(X_B, Y_B)$ are changed in the same direction. Thus, the positional displacement of the origin O along the X-direction of the object to be measured can be obtained using the sum of X components of the two displacements $(X_A, Y_A)$ and $(X_B, Y_B)$, and the positional displacement along the Y-direction of the object to be measured can be obtained using the sum of Y components of the two displacements $(X_A, Y_A)$ and $(X_B, Y_B)$. For instance, the positional displacement of the origin O of the object to be measured along the X and Y directions can be obtained as a mean value of the components.

When the object to be measured is displaced by yaw rotation, i.e., when the object to be measured rotates about the Z-axis, the displacement $(X_A, Y_A)$ and the displacement $(X_B, Y_B)$ change by different amounts. The rotational displacement about the yaw axis can be measured using a difference between the components of the two displacements $(X_A, Y_A)$ and $(X_B, Y_B)$. The difference between the components of the two displacements $(X_A, Y_A)$ and $(X_B, Y_B)$ due to the rotational yaw displacement varies depending on the distance $d_{yaw}$ between the area TA and the area TB. Accordingly, for small rotation angles, a rotational displacement $\theta_{yaw}$ about the yaw axis can be obtained by the following formula (1).

$$\theta_{yaw} = a \sin[(X_A - X_B)/2d_{yaw}] \qquad (1)$$

Alternatively, a rotational displacement $\theta_{yaw}$ about the yaw axis may be obtained by the following formula (2).

$$\theta_{yaw} = a \tan[(X_A - X_B)/d_{yaw}] \qquad (2)$$

Alternatively, taking into account components X and Y, or using vectors, the rotational displacement $\theta_{yaw}$ about the yaw axis may be obtained by the following formula (2).

$$\theta_{yaw} = a \cos(S \cdot D_{yaw})/|S| \cdot D_{yaw}| \qquad (3)$$

$D_{yaw}$ is a vector $(D_x, D_y)$ directing to the center of area TB from the center of region TA. S is a vector satisfying that $S = D_{yaw} + D_{TA} + D_{TB}$. $D_{TA} = (X_A, Y_A)$, $D_{TB} = (X_B, Y_B)$. It is possible to shorten the calculation time by using the formula (2). It is possible to improve the measurement accuracy by using the formula (3).

Thus, the speckle field images produced in the two areas TA and TB are captured multiple times, and the correlation processing is performed on each of the speckle field images. This makes it possible to obtain positional displacements in the X-direction, Y-direction, and yaw rotation by simple processing. In this exemplary embodiment, particularly when $\theta_{yaw}$ is 1° or less, the calculation time can be shortened without significant accuracy effects.

As outlined above, in some embodiments, translational and yaw rotational components of displacement are both determined during a single sample period. In some embodiments, the translational and yaw rotational components of displacement are determined cooperatively with one another, or the yaw rotation is determined based on the translational components of displacement of two imaged regions and a known separation between the regions. In some embodiments, the yaw rotational components of displacement are determined based on a translational component of displacement along a single direction for two imaged regions, and a known separation between the regions along a direction perpendicular to that single direction. In some embodiments, the single direction corresponds to a row or column direction of a detector array used for providing images. The foregoing method of determining yaw rotation allows a high measurement sample rate, which in turn allows rapid acquisition and processing of sequential measurement images which can have small rotational differences as a result of their rapid acquisition rate. The resulting small rotational differences satisfy small angle constraints in order to maintain a desired level of accuracy. For example, in one embodiment, the foregoing method may allow a measurement sample rate on the order of 32 KHz, which allows tracking of a yaw rotation rate equivalent to approximately 5333 rpm, with a single sample rotation limit of approximately 1 degree. Thus, the combination of the computation method and its resulting fast computation and measurement sample rate provide a combination of measurement rate and accuracy which is advantageous in a number of applications. For example, such an outcome is particularly desirable in applications when displacement is more important than strain, and/or when relatively large or fast displacements are to be monitored. In some embodiments, the determined yaw rotation may be compared to a single sample rotation limit (e.g., one degree), in order to determine if a rotational limit associated with an undesirable error level has been exceeded between two correlation measurement images. In some such embodiments, the image correlation displacement sensor may output an indication that the rotational limit has been exceeded and/or interrupt or supplement its measurement output with an error indication.

Moreover, in this exemplary embodiment, the telecentric optical system 250 is disposed between the target surface 300 and the detector 160. The light diffused on the target surface 300 propagates through the optical paths A and B, and through the shared telecentric optical system 250. In proximity to the target surface 300, the optical paths A and B are nominally perpendicular to the target surface 300. The optical paths A and B are refracted by the common lens 140 and pass through the common aperture 152. The detection portions DA and DB may be different portions of a single detector 160. In other words, a speckle image is captured from different portions of the target surface 300 by the common detector 160. This makes the entire optical system economical and simple.

Any processing of the processing portion 200 may be implemented by hardware, or may be implemented by causing a CPU (Central Processing Unit) to execute a computer program. The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read-only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

The displacement sensors described in the above exemplary embodiments can be applied to various applications. Although the present invention has been described above with reference to exemplary embodiments, the present invention is not limited to the above exemplary embodiments. It is easily understood by those skilled in the art that the modes and the details of the present invention can be modified in various ways without departing from the spirit and scope of the invention.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An image correlation displacement sensor for measuring a positional displacement relative to a target surface, the image correlation displacement sensor comprising:
    an illumination portion which emits illumination light to the target surface to produce a speckle field;
    an imaging portion including a detector, a first optical path that is used to capture a first plurality of images including the speckle fields produced on a first region of the target surface, and a second optical path that is used to capture a second plurality of images including the speckle fields produced on a second region of the target surface, wherein the first and second optical paths enter different parts of the detector; and
    a processing portion that measures a displacement including a rotation about a yaw axis of the target surface based on a first region translational displacement based on the first plurality of images captured along the first optical path and a second region translational displacement based on the second plurality of images captured along the second optical path, and a known separation between the first and second regions,
    wherein the image correlation displacement sensor has a measurement sample period and is configured to acquire at least one image of the first region and at least one image of the second region during a respective measurement sample period, and
    wherein the processing portion is configured to calculate at least the target surface rotation about the yaw axis during the respective measurement sample period.

2. The image correlation displacement sensor according to claim 1, wherein the first and second plurality of images are detected by respective first and second portions of a common photodetector.

3. The image correlation displacement sensor according to claim 2, wherein the first plurality of images comprises first image portions of a set of images acquired by the common photodetector and the second plurality of images comprises second image portions of that same set of images acquired by the common photodetector.

4. The image correlation displacement sensor according to claim 1, wherein:
    the imaging portion comprises a telecentric optical system, and
    the first optical path and the second optical path propagate through the telecentric optical system.

5. The image correlation displacement sensor according to claim 4, wherein:
    the telecentric optical system comprises a single aperture, and
    the first optical path and the second optical path both pass through that single aperture.

6. The image correlation displacement sensor according to claim 4, wherein:

the telecentric optical system comprises a single lens, and the first optical path and the second optical path pass through different portions of that single lens.

7. The image correlation displacement sensor according to claim 4, wherein the first optical path and the second optical path are perpendicular to the target surface in proximity to the target surface.

8. The image correlation displacement sensor according to claim 1, wherein the image correlation displacement sensor is configured to acquire at least one image of the first region and at least one image of the second region during each measurement sample period, and wherein the processing portion is configured to calculate at least the target surface rotation about the yaw axis during each measurement sample period.

9. The image correlation displacement sensor according to claim 8, wherein the processing portion measures a target surface translation, as well as the target surface rotation about the yaw axis, and wherein each sample period is based on the first region translational displacement and the second region translational displacement.

10. The image correlation displacement sensor according to claim 9, wherein the target surface translation is determined as the mean of the translation of the first and second region translational displacements.

11. The image correlation displacement sensor according to claim 8, wherein the processing portion is configured to compare the calculated target surface rotation about the yaw axis to a single sample rotation limit each measurement sample period.

12. The image correlation displacement sensor according to claim 11, wherein the image correlation displacement sensor is configured such that if the calculated target surface rotation about the yaw axis exceeds the single sample rotation limit, then the image correlation displacement sensor outputs a corresponding indication.

13. The image correlation displacement sensor according to claim 1, wherein the image correlation displacement sensor is configured such that the first region translational displacement is determined along a single direction, the second region translational displacement is determined along that single direction, and the known separation between the first and second regions is along a direction approximately perpendicular to that single direction.

14. The image correlation displacement sensor according to claim 13, wherein the imaging portion includes a photodetector array used to provide at least the first plurality of images, and the single direction corresponds to a row or column direction of the photodetector array.

15. The image correlation displacement sensor according to claim 1, wherein the processing portion is configured to compare the calculated target surface rotation about the yaw axis to a single sample rotation limit during the respective measurement sample period.

16. The image correlation displacement sensor according to claim 15, wherein the image correlation displacement sensor is configured such that if the calculated target surface rotation about the yaw axis exceeds the single sample rotation limit, then the image correlation displacement sensor outputs a corresponding indication.

* * * * *